(12) United States Patent
Rexhausen et al.

(10) Patent No.: US 9,083,236 B2
(45) Date of Patent: Jul. 14, 2015

(54) OUTPUT CURRENT SENSING METHOD IN DISCONTINUOUS DC-TO-DC VOLTAGE CONVERTER

(75) Inventors: Wolfgang Rexhausen, Thomasburg (DE); Marc Maria Alex Bleukx, Mechelen (BE)

(73) Assignee: Koninklijke Philips N.V., Eindhoven (NL)

( * ) Notice: Subject to any disclaimer, the term of this patent is extended or adjusted under 35 U.S.C. 154(b) by 453 days.

(21) Appl. No.: 13/148,960

(22) PCT Filed: Feb. 10, 2010

(86) PCT No.: PCT/IB2010/050598
§ 371 (c)(1),
(2), (4) Date: Aug. 11, 2011

(87) PCT Pub. No.: WO2010/095078
PCT Pub. Date: Aug. 26, 2010

(65) Prior Publication Data
US 2011/0311027 A1    Dec. 22, 2011

(30) Foreign Application Priority Data
Feb. 19, 2009  (EP) .................................... 09153212

(51) Int. Cl.
*G05F 1/00* (2006.01)
*H02M 3/156* (2006.01)

(52) U.S. Cl.
CPC ..................................... *H02M 3/156* (2013.01)

(58) Field of Classification Search
USPC .................................. 323/282–285, 271, 288
See application file for complete search history.

(56) References Cited

U.S. PATENT DOCUMENTS

| 4,213,082 | A | * | 7/1980 | Wisner et al. | ............. 323/271 |
| 5,045,771 | A | * | 9/1991 | Kislovski | ............. 323/282 |
| 5,731,694 | A | * | 3/1998 | Wilcox et al. | ............. 323/287 |
| 5,920,471 | A | * | 7/1999 | Rajagopalan et al. | ........ 363/89 |
| 5,982,160 | A | | 11/1999 | Walters et al. | |
| 6,051,964 | A | * | 4/2000 | Brown et al. | ............. 323/288 |
| 6,215,288 | B1 | * | 4/2001 | Ramsey et al. | ............. 323/224 |
| 6,377,032 | B1 | | 4/2002 | Andruzzi et al. | |
| 6,381,159 | B2 | * | 4/2002 | Oknaian et al. | ............. 363/98 |
| 6,879,136 | B1 | | 4/2005 | Erisman et al. | |

(Continued)

OTHER PUBLICATIONS

"Tutorial: Power Supply Conduction Modes", http://www.power-supply-designer.com/201103/conduction-modes; Downloaded Jan. 20, 2015.

(Continued)

*Primary Examiner* — Adolf Berhane
*Assistant Examiner* — Henry Lee, III

(57) ABSTRACT

The present invention refers to high-voltage generators, in particular to a step-down DC-to-DC converter circuit (buck converter) for supplying a DC output voltage $U_{out}$ which may e.g. be used in a voltage supplying circuitry of an X-ray radio-graphic imaging system. According to the invention, the peak value of the buck converter's storage inductor current $I_L$ is controlled by a control circuit μC' which regulates the on-time $\Delta t_{on}$ of a semiconductor switch S in the feeding line of this storage inductor L. As a result thereof, an output current sensor CS, which is commonly used in today's buck converter designs, becomes redundant.

19 Claims, 4 Drawing Sheets

(56) References Cited

U.S. PATENT DOCUMENTS

| | | |
|---|---|---|
| 7,545,132 B2 * | 6/2009 | Borowy et al. ............... 323/285 |
| 7,598,718 B2 * | 10/2009 | Lipcsei et al. ............... 323/284 |
| 7,656,141 B1 * | 2/2010 | Granat ........................ 323/284 |
| 7,714,547 B2 * | 5/2010 | Fogg et al. .................. 323/224 |
| 7,772,823 B2 * | 8/2010 | Blanken ....................... 323/284 |
| 8,319,486 B2 * | 11/2012 | Maksimovic et al. ........ 323/283 |
| 2004/0027098 A1 | 2/2004 | Nebon |
| 2004/0056644 A1 * | 3/2004 | Wang .......................... 323/288 |
| 2004/0239188 A1 | 12/2004 | Bohl et al. |
| 2006/0113976 A1 * | 6/2006 | Bernardon ................... 323/282 |
| 2006/0119331 A1 | 6/2006 | Jacobs et al. |
| 2007/0075694 A1 | 4/2007 | Xi et al. |

OTHER PUBLICATIONS

Ellison, "Simple Synchronous Buck Converter Design—MCP1612", Mcirochip Technology, Inc., 2005, p. 1-6.

"Inductor and Flyback", by Texas Instruments, 2001, pp. 5-1-5-19.

* cited by examiner

OUTPUT CURRENT SENSING METHOD IN DISCONTINUOUS DC-TO-DC VOLTAGE CONVERTER

FIELD OF THE INVENTION

The present invention refers to high-voltage generators, in particular to a step-down DC-to-DC converter circuit (buck converter) for supplying a DC output voltage which may e.g. be used in a voltage supplying circuitry of an X-ray radiographic imaging system. According to the invention, the peak value of the buck converter's storage inductor current is controlled by a control circuit which regulates the on-time of a semiconductor switch in the feeding line of this storage inductor. As a result thereof, an output current sensor, which is commonly used in today's buck converter designs, becomes redundant.

BACKGROUND OF THE INVENTION

A buck converter or step-down DC-to-DC converter is a switched-mode power supply which comprises a storage inductor L, an output capacitor $C_{out}$, a semiconductor switch S (which may e.g. be realized as a bipolar transistor or field effect transistor) and a freewheeling diode D for controlling the voltage drop $\underline{U}_L$ across the inductor and thus current flow $\underline{I}_L$ through this inductor. The operation of a buck converter is fairly simple, as it periodically alternates between an on-state where the inductor is connected to an input voltage $\underline{U}_{in}$ so as to store electric energy in the inductor and an off-state where the inductor is discharged into a load, such as e.g. an ohmic resistor R. In the on-state, voltage drop $\underline{U}_L$ across the inductor is given by the difference of the buck converter's input voltage $U_{in}$ and output voltage $U_{out}$. As can easily be calculated, current $\underline{I}_L$ through the inductor rises linearly. In the on-state, as freewheeling diode D is reverse-biased by input voltage $\underline{U}_{in}$, there is no current flow through this diode. In the off-state, diode D is forward-biased such that the voltage drop across the inductor is $\underline{U}_L = -\underline{U}_{out}$ (when assuming that diode voltage drop $\underline{U}_D$ is neglectable) and inductor current $\underline{I}_L$ decreases.

SUMMARY OF THE INVENTION

In conventional DC-to-DC voltage converters as disclosed in the relevant literature, it may be provided that inductor current $\underline{I}_L$ is measured by a current sensor which is placed in the inductive branch. The detected current value is fed to a control unit which controls the on-state duration $\Delta t_{on}$ of semiconductor switch S. At higher operating frequencies, a severe problem is that the reaction time of the current sensor is slow and that conversion accuracy of the buck converter decreases due to a signal delay caused by said current sensor. Further problems are the need for a supply voltage for the current sensor and the comparatively high production costs of a buck converter which comprises such a current sensor.

Therefore, it is an object of the present invention to provide a DC-to-DC voltage converter which overcomes the problems mentioned above. According to the present invention, this is achieved by a DC-to-DC voltage converter that works without being controlled dependent on measured inductor current $\underline{I}_L$ as detected by a current sensor.

To address this object, a first exemplary embodiment of the present invention is directed to a control unit for controlling the functionality of a DC-to-DC voltage converter circuit which is operated in a discontinuous current mode, wherein said control unit comprises a current simulator for simulating the slope of an inductor current which flows through a storage inductor placed in an inductive branch of said DC-to-DC voltage converter circuit in each cyclically recurrent on-state phase of a first semiconductor switch during which said storage inductor is connected to a DC input voltage of the DC-to-DC voltage converter circuit. Said control unit is thereby adapted for controlling the duration of this on-state phase based on the simulated slope of the inductor current.

According to the invention, it may be provided that the current simulator is adapted for controlling the on-state phase duration of said first semiconductor switch by charging a storage capacitor during the cyclically recurrent off-state phase of a second semiconductor switch whose duration is prescribed by the duty cycle of a digital periodic control signal, making the slope factor of the voltage drop across said capacitor depend on the simulated slope of the inductor current and making the on-state duration of said first semiconductor switch equal to the rise time of the capacitor voltage during the charging process of said storage capacitor.

In a preferred implementation of this first exemplary embodiment, said current simulator may comprise a voltage-controlled current source whose output current is used for charging said storage capacitor in the off-state phase of said second semiconductor switch, wherein said current source is controlled by a control voltage which is proportional to the difference of the DC-to-DC voltage converter circuit's input voltage and output voltage.

The control voltage may thereby be given by the difference of the DC-to-DC voltage converter circuit's input voltage and output voltage with said difference being multiplied with a gain control voltage of the voltage-controlled current source, such that the slope factor of the voltage drop across storage capacitor is direct proportional to this gain control voltage and on-state duration of said first semiconductor switch is indirect proportional to this gain control voltage.

The current simulator may advantageously be configured such that the on-state duration of said first semiconductor switch is direct proportional to a predefined DC reference voltage which is used as a supply voltage for the voltage-controlled current source.

The current simulator may also be configured such that the on-state duration of said first semiconductor switch is indirect proportional to the rise time of the capacitor voltage during the charging process of said storage capacitor.

Furthermore, a second exemplary embodiment of the present invention refers to a DC-to-DC voltage converter circuit which comprises a control unit as described with reference to said first exemplary embodiment.

This DC-to-DC voltage converter circuit may thereby be configured for realizing the functionality of a buck converter. As an alternative thereof, said DC-to-DC voltage converter circuit may thereby be configured for realizing the functionality of a boost converter.

Preferably, it may be provided that the DC-to-DC voltage converter circuit is implemented as an integrated circuit.

A third exemplary embodiment of the present invention is directed to a voltage supply unit of an X-ray system, wherein said voltage supply unit comprises a DC-to-DC voltage converter circuit as disclosed with reference to the above-described second exemplary embodiment.

A fourth exemplary embodiment of the present invention relates to an X-ray system which comprises an integrated voltage supply unit as disclosed with reference to said third exemplary embodiment.

A fifth exemplary embodiment of the present invention refers to a method for controlling the functionality of a DC-to-DC voltage converter circuit which is operated in a discontinuous current mode. According to the present invention, said method comprises the steps of simulating the slope of an inductor current which flows through a storage inductor placed in an inductive branch of said DC-to-DC voltage converter circuit in each cyclically recurrent on-state phase of a first semiconductor switch during which said storage inductor is connected to a DC input voltage of the DC-to-DC voltage converter circuit and controlling the duration of this on-state phase based on the simulated slope of the inductor current.

It may further be provided that the claimed method comprises the steps of controlling the on-state phase duration of said first semiconductor switch by charging a storage capacitor during the cyclically recurrent off-state phase of a second semiconductor switch whose duration is prescribed by the duty cycle of a digital periodic control signal, making the slope factor of the voltage drop across said capacitor depend on the simulated slope of the inductor current and making the on-state duration of said first semiconductor switch equal to the rise time of the capacitor voltage during the charging process of said storage capacitor.

Aside therefrom, said method may comprise the step of controlling the operation of a voltage-controlled current source whose output current is used for charging said storage capacitor in the off-state phase of said second semiconductor switch by a control voltage which is proportional to the difference of the DC-to-DC voltage converter circuit's input voltage and output voltage.

This control voltage may be given by the difference of the DC-to-DC voltage converter circuit's input voltage and output voltage with said difference being multiplied with a gain control voltage of the voltage-controlled current source, such that the slope factor of the voltage drop across storage capacitor is direct proportional to this gain control voltage and on-state duration of said first semiconductor switch is indirect proportional to this gain control voltage.

The on-state duration of said first semiconductor switch may thereby be direct proportional to a predefined DC reference voltage which is used as a supply voltage for the voltage-controlled current source.

According to said method, it may further be provided that the on-state duration of said first semiconductor switch is indirect proportional to the rise time of the capacitor voltage during the charging process of said storage capacitor.

Finally, a sixth exemplary embodiment of the present invention is dedicated to a computer program product for implementing a method as described with reference to said fifth exemplary embodiment when running on a processing means of a control unit according to said first exemplary embodiment.

BRIEF DESCRIPTION OF THE DRAWINGS

These and other advantageous features and aspects of the invention will be elucidated by way of example with respect to the embodiments described hereinafter and with respect to the accompanying drawings. Therein.

DETAILED DESCRIPTION OF THE PRESENT INVENTION

In the following sections, an exemplary embodiment of the claimed buck converter circuit according to the present invention will be explained in more detail, thereby referring to the accompanying drawings.

Figure 1A:
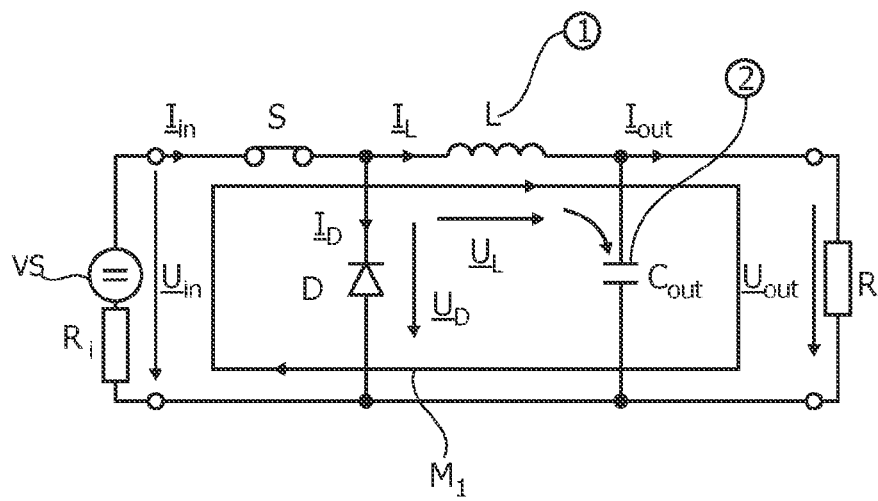
FIG. 1a shows a conventional buck converter (step-down DC-to-DC converter) circuit in an on-state.
Figure 1B:
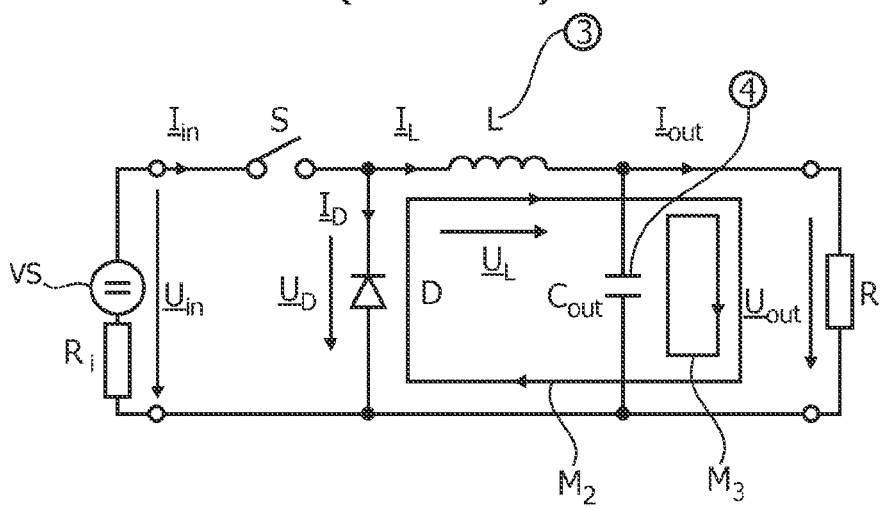
FIG. 1b shows the conventional buck converter circuit of FIG. 1a in an off-state.

A buck converter or step-down DC-to-DC converter as depicted in FIGS. 1a+b is the most elementary forward-mode voltage converter. As already described above, the basic operation of this circuit has two distinct time periods. The first one occurs when semiconductor switch S is in an on-state (cf. FIG. 1a) such that inductor L is connected to the buck converter's input voltage $\underline{U}_{in}$ and freewheeling diode D is reverse-biased. During this period, there is a constant voltage drop $\underline{U}_L$ across the inductor, and therefore inductor current $\underline{I}_L$ begins to linearly ramp upwards (see mesh $M_1$). With inductor voltage $U_L$ being equal to the difference of input voltage $\underline{U}_{in}$ and voltage $\underline{U}_{out}$ at the converter's output port during the on-state and using Faraday's law $\underline{U}_L = L \cdot d\underline{I}_L/dt$, the increase in inductor current $\underline{I}_L$ during the on-state can be expressed by the following equation:

$$\Delta I_{L(on)} = \int_{t=kT}^{kT+\Delta t_{on}} \frac{U_L}{L} dt = \frac{1}{L} \cdot (\underline{U}_{in} - \underline{U}_{out}) \cdot \Delta t_{on} \forall k \in I \quad (1)$$

using $T := \Delta t_{on} + \Delta t_{off}$ with T being the duration of a commutation cycle, $\Delta t_{on}$ being the on-state duration of semiconductor switch S and $\Delta t_{off}$ being the off-state duration of said switch. During this on-state, energy is stored (see step ①) within the inductor's core material in the form of a magnetic flux $\Delta \Phi_{(on)} = L \cdot \Delta \underline{I}_{L\ (on)}$. If the inductor is properly designed, there is sufficient energy stored to carry the requirements of the load during the off-state, which is the next period of the semiconductor switch S. When semiconductor switch S turns off (cf. FIG. 1b), voltage drop $\underline{U}_L$ across inductor L reverses its polarity such that the inductor releases its stored energy (see step ③) and freewheeling diode D becomes forward-biased. This allows the electric energy $E_{el} = \frac{1}{2} L \cdot \Delta \underline{I}_{L\ (on)}^2$ stored in the inductor L to be delivered to a load (such as e.g. an ohmic resistance R) at the buck converter's output port (see mesh $M_2$) where the continuous output current $\underline{I}_{out}$ is then smoothed by output capacitor $C_{out}$ (see mesh $M_3$). Ideally, the decrease in inductor current $\underline{I}_L$ during the off-state ($\underline{U}_{in} = 0$) is given by $$\Delta I_{L(off)} = \qquad (2)$$

$$\int_{t=kT+\Delta t_{on}}^{(k+1)T} \frac{U_L}{L} dt = \frac{1}{L} \cdot (\underline{U}_D - \underline{U}_{out}) \cdot \Delta t_{off} \approx \frac{-\underline{U}_{out}}{L} \cdot \Delta t_{off} \, \forall \, k \in I$$

when assuming that voltage drop $\underline{U}_D$ across freewheeling diode D is neglectable. This period ends when the power switch is once again turned on. Regulation of the converter is accomplished by varying the duty cycle of the power switch according to the loading conditions. To achieve this, the power switch requires electronic control for proper operation.

Figure 2A:
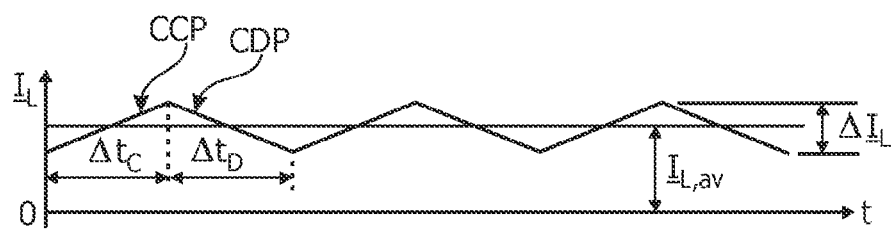
FIG. 2a shows the waveform of the buck converter's inductor current over the time in a continuous mode.
Figure 2B:
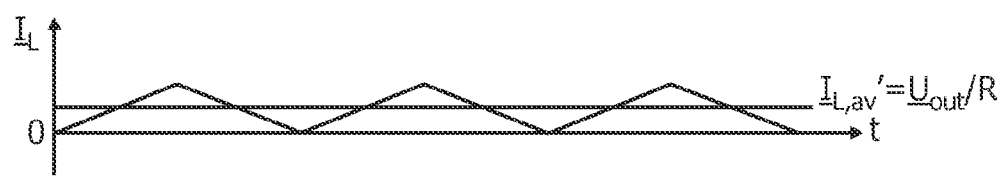
FIG. 2b shows the waveform of said inductor current over the time in a discontinuous mode.
Figure 3A:
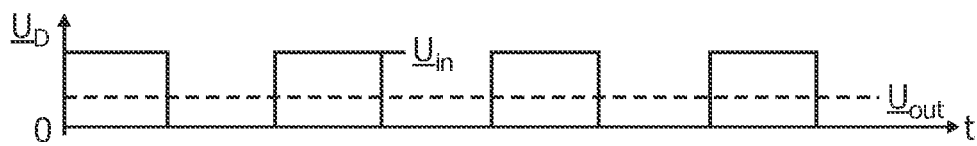
FIGS. 3a-e show the waveforms of the buck converter's diode voltage, input current, inductor current, inductor voltage and diode current over the time.
Figure 3B:
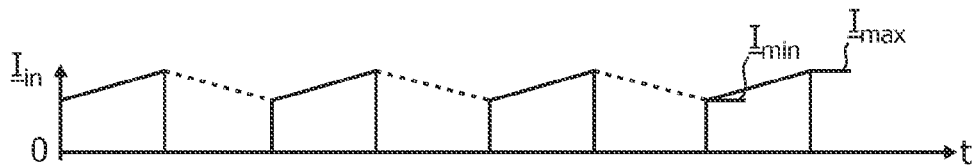
Figure 3C:
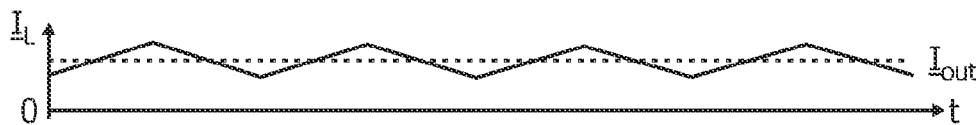
Figure 3D:
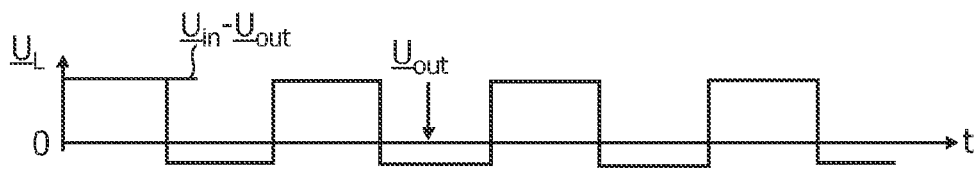
Figure 3E:
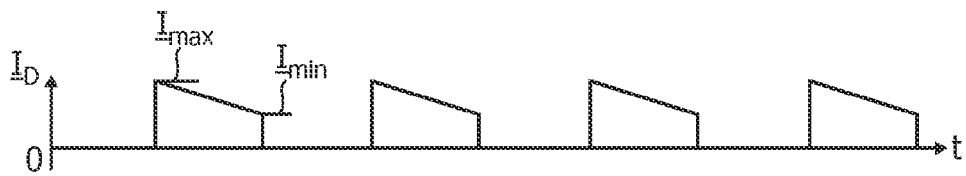

Typical waveforms for inductor current $\underline{I}_L$ are depicted in FIGS. 2a+b, wherein FIG. 2a shows $\underline{I}_L$ in the buck converter's continuous mode and FIG. 2b shows $\underline{I}_L$ in the buck converter's discontinuous mode, wherein $\Delta t_C$ (which is equal to on-state duration $\Delta t_{on}$) denotes the duration of a phase CCP during which output capacitor $C_{out}$ is charged (see step ②) and $\Delta t_D$ (which is equal to off-state duration $\Delta t_{off}$) denotes the duration of a subsequent phase CDP during which output capacitor $C_{out}$ is discharged (see step ④). In FIG. 2a, inductor current $\underline{I}_L$ fluctuates by up to $\Delta \underline{I}_L/2$ about an average value denoted as $\underline{I}_{L,av}$, whereas in FIG. 2b the average value of inductor current $\underline{I}_L$ is given by $\underline{I}_{L,av}'=\underline{U}_{out}/R$, which is much lower than $\underline{I}_{L,av}$. The waveforms of diode voltage $\underline{U}_D$, current $\underline{I}_{in}$ at the buck converter's input port, inductor current $\underline{I}_L$, inductor voltage $\underline{U}_L$ and diode current $\underline{I}_D$ (which lies between a maximum value $\underline{I}_{max}$ and a minimum value $\underline{I}_{min}$ such as input current $\underline{I}_{in}$) can be taken from FIGS. 3a-e.

If we assume that the buck converter operates in steady state, the energy stored in each component at the end of a commutation cycle of duration T is equal to that at the beginning of the cycle. That means that inductor current $\underline{I}_L$ is the same at $t=t_0+k\cdot T$ (with $t_0 \in [0, T[$ and $k \in I$). Therefore, it can be written that $\Delta \underline{I}_{L(on)} + \Delta \underline{I}_{L(off)} = 0$, and with equations (1) and (2) it is thus possible to calculate the buck converter's duty cycle as follows:

$$\delta := \frac{\Delta t_{on}}{T} = \frac{\Delta t_{on}}{\Delta t_{on} + \Delta t_{off}} = \frac{\underline{U}_{out}}{\underline{U}_{in}}, \qquad (3)$$

wherein $T:=\Delta t_{on}+\Delta t_{off}$ denotes the switching period. From equation (3), it can be derived that the converter's output voltage $\underline{U}_{out}$ varies linearly with the duty cycle for a given input voltage $\underline{U}_{in}$. As said duty cycle $\delta$ is equal to the ratio between on-state duration $\Delta t_{on}$ and period duration T, it cannot be greater than 1. It can thus be stated that $|\underline{U}_{out}| \leq |\underline{U}_{in}|$. This is why this converter is referred to as "step-down converter". For example, stepping a DC input voltage of 12 V down to a DC output voltage of 3 V would require a duty cycle of 25% in a theoretically ideal circuit.

Figure 4A:
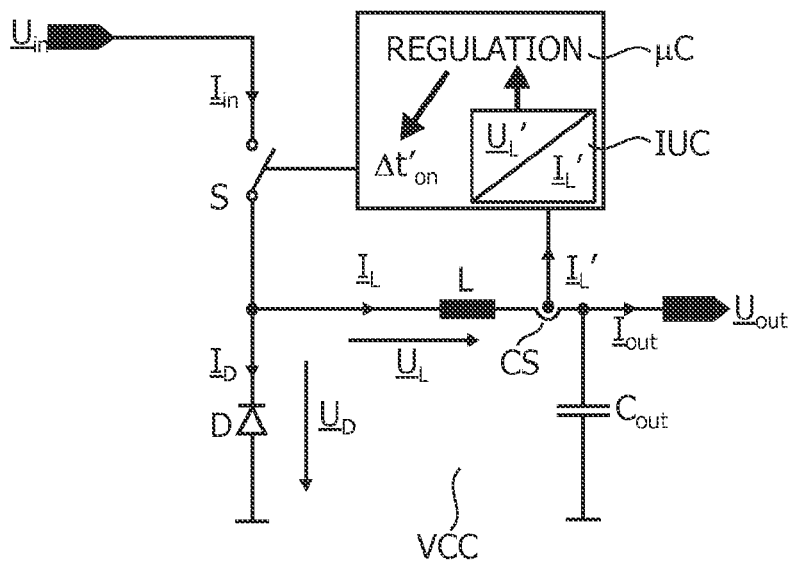
FIG. 4a shows a current sensor based buck converter control circuit according to the prior art.

A conventional buck converter circuit as known from the prior art where the inductor current $\underline{I}_L$ is measured by a current sensor CS which is connected in series to the inductor L is shown in FIG. 4a. As depicted, a current value which is detected during the buck converter's on-state (in the following referred to as $\underline{I}_L'$) is fed to a control unit μC where it is transformed into a corresponding voltage $\underline{U}_L'$ by means of an integrated current-to-voltage converter IUC. The control unit controls the on-state duration $\Delta t_{on}$ of semiconductor switch S such that the regulation difference between a desired value of $\Delta t_{on}=\delta \cdot T$ and its actual value $\Delta t_{on}'$, which can be derived from $\underline{U}_L'$ by calculating $$\Delta t_{on}' = \frac{\underline{U}_{out}}{\underbrace{\underline{U}_L' + \underline{U}_{out}}_{\approx d}} \cdot T \approx \Delta t_{on}, \qquad (4)$$

can at least approximately be compensated. As already mentioned above, a severe problem is that at higher operating frequencies the reaction time of current sensor CS is slow and that conversion accuracy of the buck converter decreases due to a signal delay caused by said current sensor.

Figure 4B:
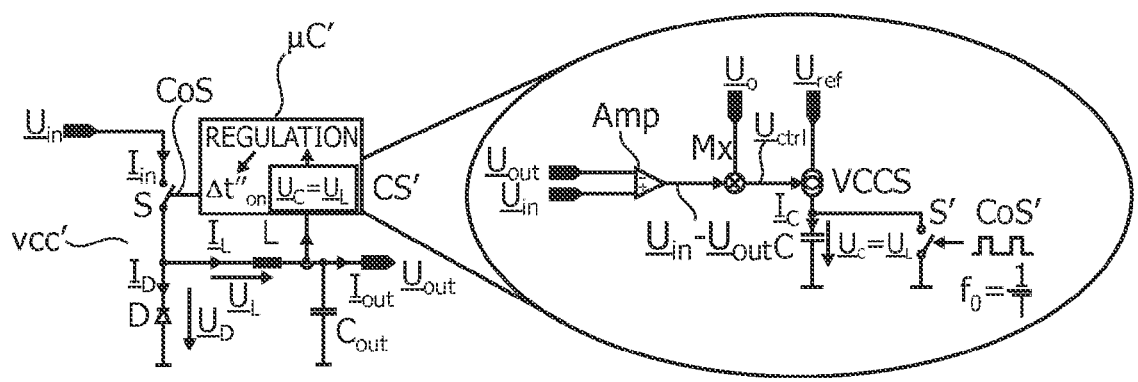
FIG. 4b shows a buck converter control circuit according to the present invention, which is based on the principle of inductor current rise simulation.

A modified buck converter circuit according to the proposed invention of the present application is shown in FIG. 4b. As can be taken from this drawing, the main idea of the invention is to generate current sensor signal $\underline{I}_L'$ with an alternative method where current sensor CS is replaced by a current simulator. On-state duration $\Delta t_{on}$ of semiconductor switch S is thereby controlled by a control unit μC' which implements the function of said current simulator by simulating the slope $d\underline{I}_L/dt$ of inductor current $\underline{I}_L$ during the buck converter's on-state. This is possible by making use of the discontinuous mode of inductor current $\underline{I}_L$. In this mode, the inductor current starts at zero at the beginning of each cycle of switching frequency $f_0=1/T$ such that $\Delta \underline{I}_L$ in the equations above can be replaced by $\underline{I}_L$. With known inductance value of storage inductor L and known values of input voltage $U_{in}$ and output voltage $\underline{U}_{out}$, it is then possible to simulate the slope factor $d\underline{I}_{L\,(on)}/dt$ of inductor current $\underline{I}_L$ by calculating $$\frac{dI_{L(on)}}{dt} = \frac{\underline{U}_{L(on)}}{L} = \frac{1}{L} \cdot (\underline{U}_{in} - \underline{U}_{out}), \qquad (5)$$

which can be derived from equation (1). Using equation (5), current peaks of inductor current $\underline{I}_L$ can be limited by adapting rise time $\Delta t$ of a reference sawtooth voltage $\underline{U}_C$ lying at an integrated storage capacitor C of control unit μC' which corresponds to difference voltage $(\underline{U}_{in}-\underline{U}_{out})$ that is equal to $\underline{U}_L$, wherein on-state duration $\Delta t_{on}''$ of semiconductor switch S is set to rise time $\Delta t$ of reference sawtooth voltage $\underline{U}_C$:

$$\Delta t_{on}'' := \Delta t \text{ with } \Delta t = \Delta \underline{U}_C \cdot \frac{dt}{d\underline{U}_{C(on)}(t)} = \underline{U}_{ref} \cdot \frac{C}{I_{C(on),max}} \qquad (6a)$$

using $\underline{U}_{C(on)}(t) =$ (6b)

$$\int_{\tau=kT}^{kT+t} \frac{I_{C(on),max}}{C} d\tau = \frac{1}{C} \cdot I_{C(on),max} \cdot t \, \forall \, k \in I \text{ (for } 0 \leq t \leq \Delta t\text{)},$$

$$I_{C(on),max} \propto \underline{U}_{in} - \underline{U}_{out}(\text{with } \underline{U}_{in} - \underline{U}_{out} = \underline{U}_L) \text{ and } \Delta \underline{U}_C = \underline{U}_{ref}. \qquad (6c, 6d)$$

Figures 5A, 5B:
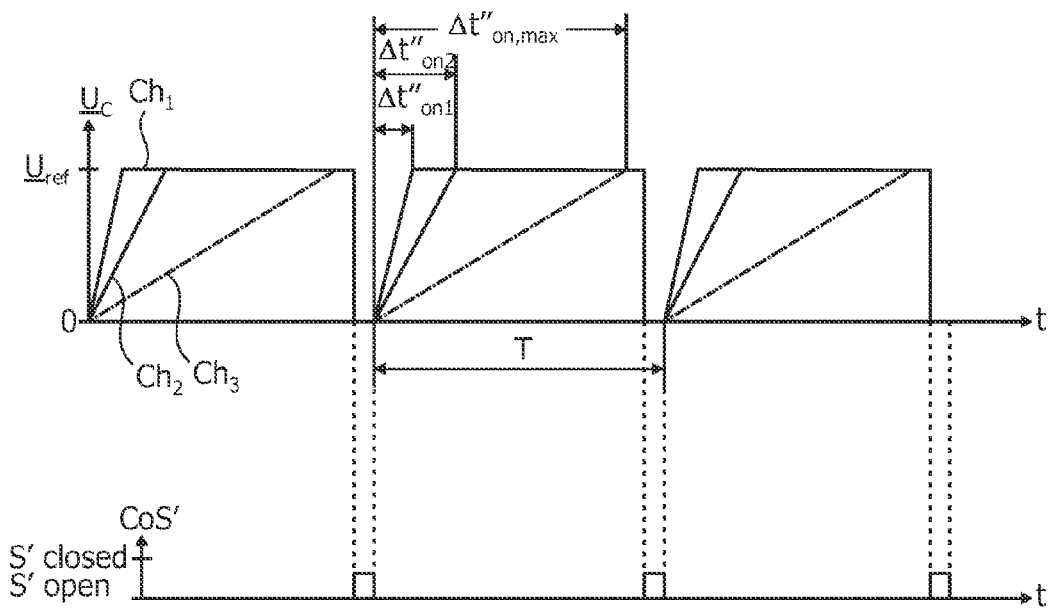
FIG. 5a shows the sawtooth waveform of the voltage drop across an integrated storage capacitor of the buck converter control circuit of FIG. 4b with said voltage drop being used for simulating the voltage drop across the buck converter's inductor.
FIG. 5b shows a time diagram of a digital control signal which is used for controlling the off-state duration of a semiconductor switch during which said storage capacitor is charged.

During the off-state of an integrated semiconductor switch S' of control unit μC' with said switch being controlled by a digital control signal CoS' (see FIG. 5b) with clock rate $f_0=1/T$, storage capacitor C is charged with a charge current $\underline{I}_C$ which is supplied by an integrated voltage-controlled current source VCCS of said control unit μC'. Using simulated slope factor $d\underline{I}_L/dt$ of inductor current $\underline{I}_L$, maximum charge current $I_{C(on),max}$ can be made proportional to said difference voltage (see equation (6c)) by a voltage-controlled current source VCCS as follows from the following equation:

$$I_{C(on),max} = \frac{U_0}{[V]} \cdot \int_{\tau=kT}^{kT+\Delta t'} \frac{dI_{L(on)}}{dt} d\tau = \qquad (7)$$

-continued $$\frac{U_0}{[V]} \cdot \int_{\tau=kT}^{kT+\Delta t'} \frac{1}{L} \cdot (U_{in} - U_{out}) d\tau = \frac{U_0}{[V]} \cdot \frac{1}{L} \cdot (U_{in} - U_{out}) \cdot \Delta t' =$$

$$\chi \cdot \underbrace{(U_{in} - U_{out})}_{=U_L} \quad \forall k \in /(\text{for } 0 \leq t \leq \Delta t)$$

with $U_0$ (divided through its physical unit "volt", here denoted as [V]) being a controllable gain factor. Equation (7) thus teaches that the higher difference voltage ($U_{in}-U_{out}$), the higher is current $I_{C(on),max}$. Gain control voltage $U_0$ in constant proportionality factor $$\chi := \frac{U_0}{[V]} \cdot \frac{1}{L} \cdot \Delta t', \quad (8)$$

wherein $\Delta t'$ denotes the off-state time of semiconductor switch S' as prescribed by control signal CoS', is thereby multiplied to difference voltage ($U_{in}-U_{out}$) by means of a mixer Mx. Moreover, equation (6a) shows that the higher $I_{C(on),max}$, the shorter is rise time $\Delta t$ of reference sawtooth voltage $U_C$ (whose waveform can be taken from FIG. 5a) and thus on-time $\Delta t_{on}''$ of semiconductor switch S, which is due to $\Delta t_{on}'' \propto 1/I_{C(on),max}$. Faraday's law $I_{C(on),max}=C \cdot dU_{C(on)}/dt$ in conjunction with equation (7) shows that slope $dU_{C(on)}/dt$ of voltage drop $U_C$ across storage capacitor C during the on-time of semiconductor switch S' is given by $$\frac{dU_{C(on)}}{dt} = \frac{U_0}{[V]} \cdot \frac{1}{C} \cdot \int_{\tau=kT}^{kT+\Delta t'} \frac{dI_{L(on)}}{dt} d\tau = \chi' \cdot \underbrace{(U_{in}-U_{out})}_{=U_L} = \zeta \cdot U_{ctrl} \quad (9a)$$

with $$\chi' := \frac{U_0}{[V]} \cdot \frac{1}{LC} \cdot \Delta t', \zeta := \frac{\Delta t'}{LC} \text{ and } U_{ctrl} = \frac{U_0}{[V]} \cdot (U_{in}-U_{out}), \quad (9b-d)$$

from which it can be seen that slope factor $dU_{C(on)}/dt$, which is direct proportional to difference voltage ($U_{in}-U_{out}$), does not only depend on current slope $dI_{L(on)}/dt$ but is also direct proportional to the gain control voltage $U_0$ which is supplied by mixer Mx such that $dU_{C(on)}/dt$ is controllable by gain control voltage $U_0$ and duty cycle $\delta'=\Delta t'/T$ of digital periodic control signal CoS'. $U_{ctrl}$ thereby denotes the control voltage of voltage-controlled current source VCCS, and $\chi'$ and $\zeta$ are two further proportionality factors. Using equations (6a), (7) and (8), on-state duration $\Delta t_{on}''$ of semiconductor switch S can thus be calculated as follows:

$$\Delta t_{on}'' = \frac{U_{ref}}{U_{in}-U_{out}} \cdot \frac{[V]}{U_0} \cdot \frac{LC}{\Delta t'}. \quad (10)$$

The advantage of the proposed solution is an enhanced control of high-current and high-frequency buck converter circuits. The invention thereby solves the above-described problem by reducing said delay time. In comparison to conventional buck converter control circuits with a current sensor the proposed solution according to the invention is able to work at high switching frequencies, it is less expensive and saves electronic components. As a consequence thereof, the proposed circuit is more space-saving than conventional bulky current sensors.

Applications of the Invention

The invention can especially be applied in power supplies, high-voltage generators and DC/DC converter circuits which are operated in a discontinuous current mode. It can thus be used in the scope of buck converters (step-down converters) and boost converters (step-up converters) in all power ranges and all switching frequencies. In particular, the present invention can be applied in a step-down DC-to-DC converter circuit for supplying a DC output voltage which may e.g. be used in a voltage supplying circuitry of an X-ray radiographic imaging system or any other system where it is necessary to supply a load with an up- or down-converted DC voltage with reduced voltage ripples due to converter-inherent switching delays.

While the present invention has been illustrated and described in detail in the drawings and in the foregoing description, such illustration and description are to be considered illustrative or exemplary and not restrictive, which means that the invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures can not be used to advantage. A computer program may be stored/distributed on a suitable medium, such as e.g. an optical storage medium or a solid-state medium supplied together with or as part of other hardware, but may also be distributed in other forms, such as e.g. via the Internet or other wired or wireless telecommunication systems. Furthermore, any reference signs in the claims should not be construed as limiting the scope of the invention.

List of Reference Signs

Amp Operational amplifier
C Integrated storage capacitor of control unit μC'
$Ch_1$ First characteristic of capacitor voltage drop $U_C$ with steep slope $dU_C/dt$ and small rise time $\Delta t=\Delta t_{on1}''$, with $\Delta t_{on1}''$ being a correspondingly small on-state duration of semiconductor switch S, where control voltage $U_{ctrl}$ of voltage-controlled current source VCCS is given by $U_{ctrl}=(U_0/[V]) \cdot (U_{in}-U_{out})$ with gain control voltage $U_0$ being $U_0=6 \cdot U_{min}$
$Ch_2$ Second characteristic of capacitor voltage drop $U_C$ with less steep slope $dU_C/dt$ and less small rise time $\Delta t=\Delta t_{on2}''$, with $\Delta t_{on2}''$ being a correspondingly less small on-state duration of semiconductor switch S, where control voltage $U_{ctrl}$ of voltage-controlled current source VCCS is given by $U_{ctrl}=(U_0/[V]) \cdot (U_{in}-U_{out})$ with gain control voltage $U_0$ being $U_0=3 \cdot U_{min}$
$Ch_3$ Third characteristic of capacitor voltage drop $U_C$ with least steep slope $dU_C/dt$ and longest rise time $\Delta t=\Delta t_{on,max}''$, with $\Delta t_{on,max}''$ being the maximum on-state duration of semiconductor switch S, where control voltage $U_{ctrl}$ of voltage-controlled current source VCCS is given by $U_{ctrl}=(U_0/[V]) \cdot (U_{in}-U_{out})$ with gain control voltage $U_0$ being $U_0=z \cdot U_{min}$ for $0<z \leq 1$
$C_{out}$ Output capacitor
CCP Charge phase of output capacitor $C_{out}$
CDP Discharge phase of output capacitor $C_{out}$
CoS Digital control signal of semiconductor switch S
CoS' Digital periodic control signal of semiconductor switch S'
CS Current sensor
CS' Current simulator, integrated in control unit μC'

D Freewheeling diode
$dI_{L(on)}/dt$ Slope factor of inductor current $I_{L(on)}$ during the on-state phase of semiconductor switch S
$dU_{C(on)}/dt$ Slope factor of voltage drop $U_C$ across storage capacitor C
δ Duty cycle of control signal CoS for controlling semiconductor switch S
δ' Duty cycle of control signal CoS' for controlling semiconductor switch S'
$f_0$ Switching frequency (clock rate) of semiconductor switch S'
$I_C$ Charge current of storage capacitor C
$I_{C(on)}$ Charge current of storage capacitor C during the off-state phase of semiconductor switch S'
$I_{C(on),max}$ Maximum charge current of storage capacitor C in the off-state phase of semiconductor switch S'
$I_D$ Diode current
$I_{in}$ DC input current
$I_{max}$ Maximum value of input current $I_{in}$ and diode current $I_D$
$I_{min}$ Minimum value of input current $I_{in}$ and diode current $I_D$
$I_L$ Inductor current
$I_{L(on)}$ Inductor current during the on-state phase of semiconductor switch S
$I_L'$ Measured inductor current as detected by current sensor CS
$I_{L,av}$ Average inductor current in continuous current mode
$I_{L,av}'$ Average inductor current in discontinuous current mode
$I_{out}$ DC output current
IUC Current-to-voltage converter
$\Delta I_L$ Increase/decrease in inductor current $I_L$
$\Delta I_{L(on)}$ Increase in inductor current $I_L$ during the on-state of semiconductor switch S
$\Delta I_{L(off)}$ Decrease in inductor current $I_L$ during the off-state of semiconductor switch S
L Storage inductor
$M_1$ First mesh, active in on-state of the buck converter circuit
$M_2$ Second mesh, active in off-state of the buck converter circuit
$M_3$ Third mesh, active in off-state of the buck converter circuit
Mx Mixer
μC Conventional control unit for calculating on-state duration $\Delta t_{on}'$ of semiconductor switch S based on measured inductor current $I_L'$ and known values of output voltage $U_{out}$ and commutation cycle duration T
μC' Control unit with simulator functionality for simulating the slope of inductor current and calculating on-state duration $\Delta t_{on}''$ of semiconductor switch S based on reference voltage level $U_{ref}$ and known capacitance value of storage capacitor C and known value of its charge current $I_C$ as proposed by the present invention
R Load (here given by an ohmic resistor)
$R_i$ Inner resistance of DC voltage source VS
S Semiconductor switch of voltage converter circuit VCC or VCC', also referred to as first semiconductor switch
S' Semiconductor switch of control circuit μC', also referred to as second semiconductor switch
T Duration of a commutation cycle
t Continuous time variable
$\Delta t$ Rise time of reference voltage $U_C$ across storage capacitor C during the on-state phase of semiconductor switch S with $\Delta t$ being equal to $\Delta t_{on}''$
$\Delta t'$ Off-state phase of semiconductor switch S' as prescribed by control signal CoS'
$\Delta t_C$ Duration of phase CCP during which output capacitor $C_{out}$ is charged
$\Delta t_D$ Duration of phase CDP during which output capacitor $C_{out}$ is discharged
$\Delta t_{off}$ Off-state duration of semiconductor switch S
$\Delta t_{on}$ On-state duration of semiconductor switch S
$\Delta t_{on}'$ On-state duration of semiconductor switch S, calculated from measured inductor current $I_L'$ and known values of output voltage $U_{out}$ and commutation cycle duration T
$\Delta t_{on}''$ On-state duration of semiconductor switch S, calculated from reference voltage level $U_{ref}$ and known capacitance value of storage capacitor C and known value of its charge current $I_C$
$\Delta t_{on1}''$ Small on-state duration of semiconductor switch S
$\Delta t_{on2}''$ Less small on-state duration of semiconductor switch S
$\Delta t_{on,max}''$ Maximum on-state duration of semiconductor switch S
$U_0$ Gain control voltage
$U_C$ Voltage drop across storage capacitor C
$U_{ctrl}$ Control voltage of voltage-controlled current source VCCS
$U_D$ Voltage drop across freewheeling diode D
$U_{in}$ DC input voltage
$U_L$ Voltage drop across storage inductor L
$U_{L(on)}$ Inductor voltage during the on-state phase of semiconductor switch S
$U_L'$ Inductor voltage, calculated from measured inductor current $I_L'$
$U_{min}$ Minimum gain control voltage
$U_{ref}$ DC reference voltage, used as a supply voltage of voltage-controlled current source VCCS
$U_{out}$ DC output voltage
VCC DC-to-DC voltage converter circuit according to the prior art as shown in FIG. 4a (realized as a buck converter or step-down DC-to-DC voltage converter)
VCC' DC-to-DC voltage converter circuit according to the present invention as shown in FIG. 4b (exemplarily realized as a buck converter or step-down DC-to-DC voltage converter)
VCCS Voltage-controlled current source
VS DC voltage source
χ Proportionality factor
χ' Further proportionality factor
ζ Still further proportionality factor
① Step of inductor L storing energy
② Step of output capacitor $C_{out}$ being charged
③ Step of inductor L releasing its stored energy
④ Step of output capacitor C

The invention claimed is:
1. A control unit (μC') comprising a current simulator (CS') configured for simulating a slope ($dI_{L(on)}/dt$) of an inductor current ($I_{L(on)}$) which flows through a storage inductor (L) placed in an inductive branch of a DC-to-DC voltage converter circuit (VCC') which is being operated in a discontinuous current mode, said inductor current ($I_{L(on)}$) being such that the flowing occurs in each cyclically recurrent on-state phase of a first semiconductor switch (S) during which said storage inductor (L) is connected to a DC input voltage ($U_{in}$) of the DC-to-DC voltage converter circuit (VCC'),
said current simulator (CS') being configured for charging, based on the simulated slope ($dI_{L(on)}/dt$) of the inductor current ($I_{L(on)}$), a storage capacitor (C) and for detecting a rise time of capacitor voltage with respect to said charging,
said control unit (μC') being configured for using the detected rise time in setting, equal to said detected rise time, a duration of said on-state phase, to thereby control functionality of said DC-to-DC voltage converter circuit (VCC').

2. The control unit (µC') according to claim 1, said charging occurring during the cyclically recurrent off-state phase of a second semiconductor switch (S') whose duration ($\Delta t'$) is prescribed by the duty cycle ($\delta'$) of a digital periodic control signal (CoS'), said current simulator (CS') configured for making the slope factor ($dU_{C(on)}/dt$) of the voltage drop ($U_C$) across said capacitor (C) depend on the simulated slope ($dI_{L(on)}/dt$) of the inductor current ($I_{L(on)}$).

3. The control unit (µC') according to claim 2, wherein said current simulator (CS') comprises a voltage-controlled current source (VCCS) whose output current ($I_{C(on)}$) is used for charging said storage capacitor (C) in the off-state phase of said second semiconductor switch (S'), said voltage-controlled current source (VCCS) being controlled by a control voltage ($U_{ctrl}$) which is proportional to the difference of the DC-to-DC voltage converter circuit's input voltage ($U_{in}$) and output voltage ($U_{out}$).

4. A control unit (µC') for controlling the functionality of a DC-to-DC voltage converter circuit (VCC') which is operated in a discontinuous current mode, said control unit comprising a current simulator (CS') for simulating the slope ($dI_{L(on)}/dt$) of an inductor current ($I_{L(on)}$) which flows through a storage inductor (L) placed in an inductive branch of said DC-to-DC voltage converter circuit (VCC') in each cyclically recurrent on-state phase of a first semiconductor switch (S) during which said storage inductor (L) is connected to a DC input voltage ($U_{in}$) of the DC-to-DC voltage converter circuit (VCC'),
wherein said control unit (µC') is adapted for controlling the duration ($\Delta t_{on}$) of this on-state phase based on the simulated slope ($dI_{L(on)}/dt$) of the inductor current ($I_{L(on)}$),
wherein said current simulator (CS') is adapted for controlling the on-state phase duration ($\Delta t_{on}$) of said first semiconductor switch (S) by charging a storage capacitor (C) during the cyclically recurrent off-state phase of a second semiconductor switch (S') whose duration ($\Delta t'$) is prescribed by the duty cycle ($\delta'$) of a digital periodic control signal (CoS'), making the slope factor ($dU_{C(on)}/dt$) of the voltage drop ($U_C$) across said capacitor (C) depend on the simulated slope ($dI_{L(on)}/dt$) of the inductor current ($I_{L(on)}$) and making the on-state duration ($\Delta t_{on}''$) of said first semiconductor switch (S) equal to the rise time ($\Delta t$) of the capacitor voltage ($U_C$) during the charging process of said storage capacitor (C),
wherein said control voltage ($U_{ctrl}$) is given by the difference of the DC-to-DC voltage converter circuit's input voltage ($U_{in}$) and output voltage ($U_{out}$) with said difference being multiplied with a gain control voltage ($U_0$) of the voltage-controlled current source (VCCS), such that the slope factor ($dU_{C(on)}/dt$) of the voltage drop ($U_C$) across storage capacitor (C) is directly proportional to this gain control voltage ($U_0$) and on-state duration ($\Delta t_{on}''$) of said first semiconductor switch (S) is indirectly proportional to this gain control voltage ($U_0$).

5. The control unit (µ') according to claim 4, wherein current simulator (CS') is configured such that the on-state duration ($\Delta t_{on}''$) of said first semiconductor switch (S) is directly proportional to a predefined DC reference voltage ($U_{ref}$) which is used as a supply voltage for the voltage-controlled current source (VCCS).

6. The control unit (µC') according to claim 5, wherein current simulator (CS') is configured such that the on-state duration ($\Delta t_{on}''$) of said first semiconductor switch (S) is inversely proportional to an off-state duration ($\Delta t'$) of said second semiconductor switch (S').

7. A DC-to-DC voltage converter circuit (VCC') which comprises a control unit (µC') according to claim 1.

8. The DC-to-DC voltage converter circuit (VCC') according to claim 7, configured for realizing the functionality of a buck converter.

9. The DC-to-DC voltage converter circuit (VCC') according to claim 7, configured for realizing the functionality of a boost converter.

10. The DC-to-DC voltage converter circuit (VCC') according to claim 7, implemented as an integrated circuit.

11. A voltage supply unit of an X-ray system, said voltage supply unit comprising a DC-to-DC voltage converter circuit (VCC') according to claim 7.

12. An X-ray system which comprises an integrated voltage supply unit according to claim 11.

13. A method comprising the steps of:
simulating a slope ($dI_{L(on)}/dt$) of an inductor current ($I_{L(on)}$) which flows through a storage inductor (L) placed in an inductive branch of a DC-to-DC voltage converter circuit (VCC') which is being operated in a discontinuous current mode, the flowing occurring in each cyclically recurrent on-state phase of a first semiconductor switch (S) during which said storage inductor (L) is connected to a DC input voltage ($U_{in}$) of the DC-to-DC voltage converter circuit (VCC');
based on the simulated slope ($dI_{L(on)}/dt$) of the inductor current ($I_{L(on)}$), charging a storage capacitor (C);
detecting a rise time of capacitor voltage with respect to said charging; and
setting, equal to the detected rise time, a duration of said on-state phase, to thereby control functionality of said DC-to-DC voltage converter circuit (VCC').

14. The method according to claim 13, said charging being performed during the cyclically recurrent off-state phase of a second semiconductor switch (S') whose duration ($\Delta t'$) is prescribed by the duty cycle ($\delta'$) of a digital periodic control signal (CoS'), said method further comprising the step of:
making the slope factor ($dU_{C(on)}/dt$) of the voltage drop ($U_C$) across said capacitor (C) depend on the simulated slope ($dI_{L(on)}/dt$) of the inductor current ($I_{L(on)}$).

15. A non-transitory computer readable medium for controlling a circuit, said medium embodying a computer program having instructions executable by a processor for performing a plurality of acts, said plurality comprising the acts of:
simulating a slope ($dI_{L(on)}/dt$) of an inductor current ($I_{L(on)}$) which flows through a storage inductor (L) placed in an inductive branch of a DC-to-DC voltage converter circuit (VCC') which is being operated in a discontinuous current mode, the flowing occurring in each cyclically recurrent on-state phase of a first semiconductor switch (S) during which said storage inductor (L) is connected to a DC input voltage ($U_{in}$) of the DC-to-DC voltage converter circuit (VCC');
based on the simulated slope ($dI_{L(on)}/dt$) of the inductor current ($I_{L(on)}$), charging a storage capacitor (C);
detecting a rise time of capacitor voltage with respect to said charging; and
setting, equal to the detected rise time, a duration of said on-state phase, to thereby control functionality of said DC-to-DC voltage converter circuit (VCC').

16. The control unit (µC') of claim 2, said current simulator (CS') comprising said second semiconductor switch (S').

17. The control unit (µC') of claim 16, said charging occurring in an off-state of said second semiconductor switch (S').

18. The control unit (µC') of claim 1, said DC-to-DC voltage converter circuit (VCC') comprising a freewheeling diode (D).

19. The control unit (µC') of claim 8, said buck converter being nonsynchronous.

\* \* \* \* \*